United States Patent
Peitzke et al.

(10) Patent No.: US 9,096,144 B2
(45) Date of Patent: Aug. 4, 2015

(54) COMBINED SYNCHRONOUS AND ASYNCHRONOUS POWER SUPPLY FOR ELECTRICALLY POWERED SHUTTLE TRAINS

(75) Inventors: William R. Peitzke, Montecito, CA (US); Matthew B. Brown, San Diego, CA (US)

(73) Assignee: ADVANCED RAIL ENERGY STORAGE, LLC, Seattle, WA (US)

( * ) Notice: Subject to any disclaimer, the term of this patent is extended or adjusted under 35 U.S.C. 154(b) by 168 days.

(21) Appl. No.: 13/449,178

(22) Filed: Apr. 17, 2012

(65) Prior Publication Data

US 2012/0265378 A1 Oct. 18, 2012

Related U.S. Application Data

(60) Provisional application No. 61/476,385, filed on Apr. 18, 2011.

(51) Int. Cl.
| | |
|---|---|
| *B60M 3/00* | (2006.01) |
| *B61C 3/00* | (2006.01) |
| *H02J 3/14* | (2006.01) |
| *H02J 3/46* | (2006.01) |

(52) U.S. Cl.
CPC .. *B60M 3/00* (2013.01); *B61C 3/00* (2013.01); *H02J 3/14* (2013.01); *H02J 3/46* (2013.01); *Y02B 70/3225* (2013.01); *Y02T 30/10* (2013.01); *Y04S 20/222* (2013.01)

(58) Field of Classification Search
CPC . B60L 2200/26; B60L 11/1838; B60R 16/03; Y02J 10/7088; Y02J 90/12
USPC ........... 307/9.1, 82, 84, 86; 700/295; 105/289
See application file for complete search history.

(56) References Cited

U.S. PATENT DOCUMENTS

| | | | | |
|---|---|---|---|---|
| 5,517,093 | A * | 5/1996 | Augustyniak et al. | 318/63 |
| 6,497,182 | B2 * | 12/2002 | Melpolder et al. | 105/73 |
| 2007/0288131 | A1 * | 12/2007 | Yakes et al. | 701/22 |
| 2010/0230196 | A1 * | 9/2010 | Nishimura et al. | 180/165 |
| 2011/0037275 | A1 * | 2/2011 | Peitzke et al. | 290/1 R |
| 2011/0307113 | A1 * | 12/2011 | Kumar et al. | 700/291 |

* cited by examiner

*Primary Examiner* — Helal A Algahaim
*Assistant Examiner* — Michael Fouche
(74) *Attorney, Agent, or Firm* — Felix L. Fischer

(57) ABSTRACT

A power supply and control system for electrically powered shuttle-trains incorporates at least one shuttle train having a motor and a generator. A first plurality of track segments has associated synchronous power modules exchanging power synchronously with a power grid through a plurality of power supply rail segments connectable to the motor or generator. A second plurality of track segments has associated variable frequency power modules exchanging power through a second plurality of power supply rail segments connectable to the motor or generator. Isolation segments separate adjacent power supply rail segments. A control system interconnected to the variable frequency power modules controls the frequency of each variable frequency power module based on the location of the shuttle train.

16 Claims, 6 Drawing Sheets

COMBINED SYNCHRONOUS AND ASYNCHRONOUS POWER SUPPLY FOR ELECTRICALLY POWERED SHUTTLE TRAINS

REFERENCE TO RELATED APPLICATIONS

This application claims the priority of U.S. Provisional Patent Application Ser. No. 61/476,385 filed on Apr. 18, 2011 having the same title as the present application, the disclosure of which is incorporated herein by reference. This application is copending with application Ser. No. 12/852,504 filed on Aug. 8, 2010 entitled UTILITY SCALE ELECTRIC ENERGY STORAGE SYSTEM, having a common assignee with the present application, the disclosure of which is incorporated herein by reference as though fully set forth.

BACKGROUND OF THE INVENTION

The present invention is in the technical field of electrification systems for electrically powered railways. More particularly, the present invention is a combined synchronous and asynchronous power supply modules for control of electrically powered shuttle-trains on a track system with segmented power supply rails.

Conventional electrified railways are not deployed for the purpose of large-scale energy storage in which grid electrical energy is stored for use at an alternate time of consumption. However, an effective means for large-scale energy storage may be achieved by constructing an electrified steel railway network which employs regenerative traction drive shuttle-trains, operating on a closed low-friction automated steel rail network, to transport heavy container-sized masses between two storage yards at different elevations, converting electricity into potential energy and back into electric power as needed. In such a system when excess energy is available on the grid, the masses are transported uphill from a lower storage yard, drawing electricity from the grid to power the motors of shuttle-trains as they move the masses against the force of gravity to an upper storage yard; when the grid requires energy to meet periods of high demand, the process may be reversed, the shuttle-trains return the masses to the lower storage yard with their generators converting the potential energy of the masses back into electricity in a highly efficient process.

The present invention is intended to facilitate the use of electrified railways for energy storage by reducing the cost and improving the serviceability and efficiency of the power conversion equipment necessary to provide frequency control of the electric power governing the speed of electrified trains operating on such a system.

In a conventional alternating current electrified railway the power provided to the locomotive is of uniform voltage and frequency across the system. The speed control of the train is generally accomplished by means of onboard rectifier/inverter sets which sense the rotational speed of a locomotives drive motors and provide power to the motors at the correct alternating current frequency to power the train at a set speed or rate of speed change. In this scenario each locomotive is required to have onboard power conversion equipment capable of rectifying trackside alternating current into onboard direct current, which is then inverted back into alternating current at the frequency required by the drive motors. The cost of this onboard power conversion equipment is a significant portion of the cost of a locomotive and the electrical losses associated with rectifying and inverting the current to a trains traction drives is significant. In the case of an electrified railway deployed for energy storage the onboard rectifier/inverter units deployed in such system must be certified for interconnection to a utility grid. Electrical equipment meeting these certification requirements is far more expensive than normal locomotive power conversion systems.

It is therefore desirable to reduce the use, number and capacity of rectifier/inverter power conversion units required to power an electrified railway certified for grid interconnection as an energy storage system.

SUMMARY OF THE INVENTION

Embodiments disclosed herein provide a power supply and control system for electrically powered shuttle-trains which incorporates at least one shuttle train having a motor and a generator. A first plurality of track segments has associated synchronous power modules exchanging power synchronously with a power grid through a plurality of power supply rail segments connectable to the motor or generator. A second plurality of track segments has associated variable frequency power modules exchanging power through a second plurality of power supply rail segments connectable to the motor or generator. Isolation segments separate adjacent power supply rail segments. A control system interconnected to the variable frequency power modules controls the frequency of each variable frequency power module based on the location of the shuttle train.

DETAILED DESCRIPTION OF THE INVENTION

The embodiments to be described provide a system to power electric trains on a primary track section directly at the alternating current frequency of a power grid while providing segments of variable frequency track as necessary for acceleration/deceleration and loading movement of trains operating on such a system. The system allows for the removal of the onboard power conversion equipment from each individual locomotive and replaces such function by connecting individually controlled trackside power conversion modules to segments of a rail systems track thereby creating variable frequency track sections which are used as acceleration/deceleration tracks. These variable frequency track segments are interconnected by segments of track that are directly powered at grid frequency. On the interconnecting segments trains maintain a constant speed determined by grid frequency and the gearing of their traction drive system. The acceleration/deceleration track segments provide the variability in alternating current frequency necessary to accelerate/decelerate trains up to or down from the speed at which their motor-generator components are in direct synchronization with the host electrical grid. In operation each variable frequency trackside power conversion module is typically powered by dual 3 level active rectifier/inverter units which are controlled by an automation system which runs the rail network. By eliminating the need to have power conversion devices onboard each train to provide the variable frequency alternating current necessary for acceleration and deceleration the number and capacity of power conversion devices necessary to operate multiple electric trains on a high traffic density rail system is significantly reduced. By allowing for primary track sections to be powered directly at grid frequency significant energy savings are realized.

Figure 1:
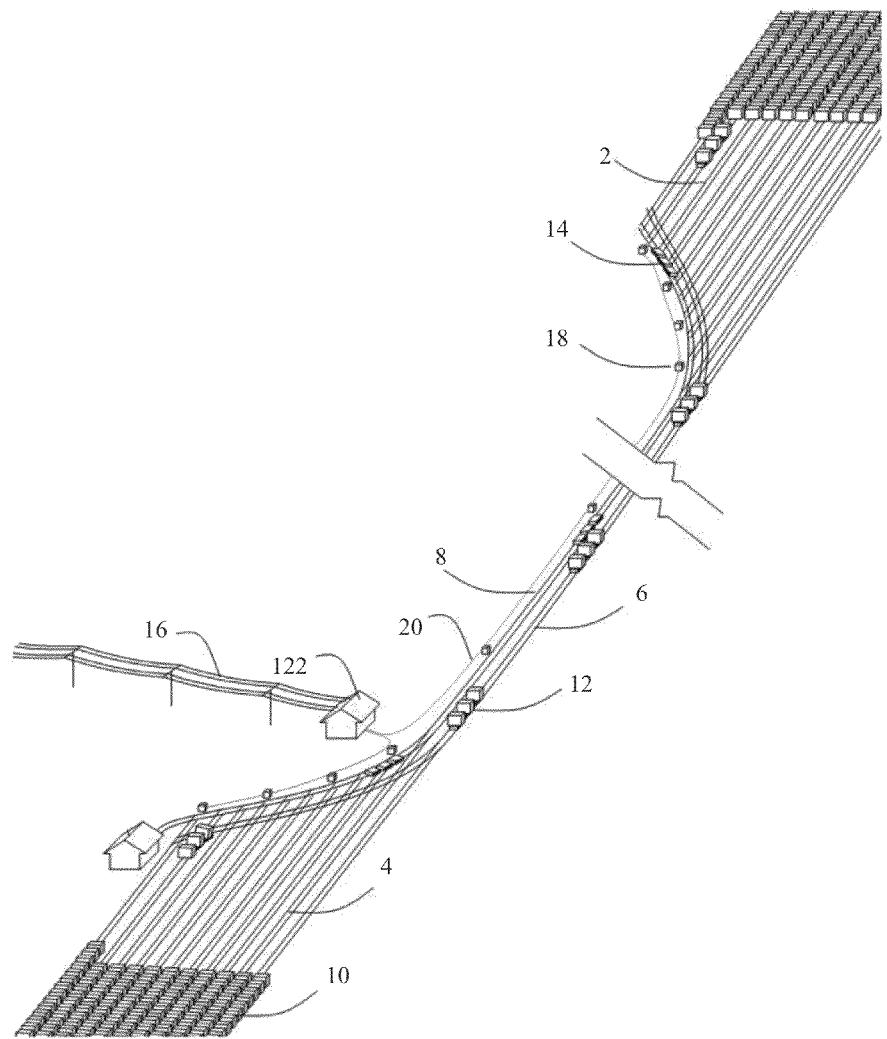
FIG. 1 is a perspective view of an electric railway deployed as an electrical energy storage facility with traditional onboard power conversion equipment.

Referring now to example embodiments in more detail, FIG. 1 shows a high traffic rail network in which multiple electrically powered shuttle-trains are the prime movers in an energy storage system operating without the benefit of the present invention. The example system has an upper storage railway yard 2, a lower storage railway yard 4 and connecting tracks 6 and 8. In operation, large masses 10 are transported between storage yards 2 and 4 by the shuttle-trains 12 on the electrified steel railway 6, storing or releasing energy by converting electricity from the electric grid 16 into potential energy and back into electric power, as needed. After each load of masses is transported the empty shuttle-trains 14 are returned to reload on the electrified steel railway 8. During operational periods of energy storage or discharge the continuous flow of shuttle-trains occupy approximately 15% of the electrified tracks 6 and 8 between the upper and lower storage yards drawing their electric power from trackside transformers 18 located approximately every 1,000 feet of track length. The fixed grid frequency of the alternating current trackside power needs to be processed onboard each individual shuttle-train by power conversion equipment into the drive frequency required to power the drive motors and generators of the shuttle-trains operation. The installed rated capacity of the shuttle-trains onboard power conversion equipment greatly exceeds the total rated charging or discharging capacity of an energy storage system operating in the described system. This is due, in part, to the fact that the returning shuttle-trains are lightly loaded and, in part, to the fact that units in the process of loading and unloading masses are consuming limited amounts of power. Hence there is much cost efficiency to be gained in reducing the number and total rated capacity of installed power conversion components in such a system. The embodiments described herein allow for the removal of the main power conversion electronics from each electrically powered vehicle and in particular the necessity to have dual 3 level active rectifier/inverter units onboard each shuttle-train. The disclosed embodiments also provide significant sections of track on which trains may operate in direct synchronization with the electrical grid at a constant speed. This direct synchronization is possible and desirable on a closed right of way dedicated use railroad, which is deployed, by means of example, as an energy storage system. This improvement is accomplished by replacing the onboard power conversion equipment in such a system with trackside power conversion modules; each module typically powering a segment of variable frequency track, typically an individual storage yard track as will be described with respect to FIG. 2. In operation the variable frequency track segments are able to function as acceleration/deceleration track segments which rely on position telemetry for location and speed information provided to a facility control system to remotely control motion of the vehicles during loading and unloading; and to accelerate and decelerate vehicles to the required speed to merge back onto primary interconnecting fixed operating frequency track segments on which the electrically powered vehicles described herein are powered in direct synchronization with the host electrical grid.

In operating a closed high volume electrified rail network employing the disclosed embodiments efficiency is gained in four major areas. First, allowing for the majority of the electrically powered vehicles inter-yard transit distance, which reflects the main consumption or power and delivery of power in the case of an energy storage system, to occur in direct grid synchronization avoids power conversion losses. Operating the shuttle trains in a synchronous mode further provides significant beneficial heavy inertia in the grid which may employ the large mass and frequency stabilization effects of the shuttle trains in operation to accommodate frequency perturbations which may occur in the grid due to variable frequency generation systems present elsewhere on the grid. Second, reducing the weight of the electrified vehicles reduces the power required to accelerate and decelerate the vehicles. Third, the number and cost of the required dual 3 level active rectifier/inverter power conversion units is significantly reduced. Finally, the use of trackside power conversion units is allowed which may now consist of equipment certified to meet the grid interconnection requirements that would otherwise not be compatible with placement onboard a moving rail vehicle. These features also provide for greatly simplified access to trackside equipment for routine maintenance and or replacement.

Figure 2:
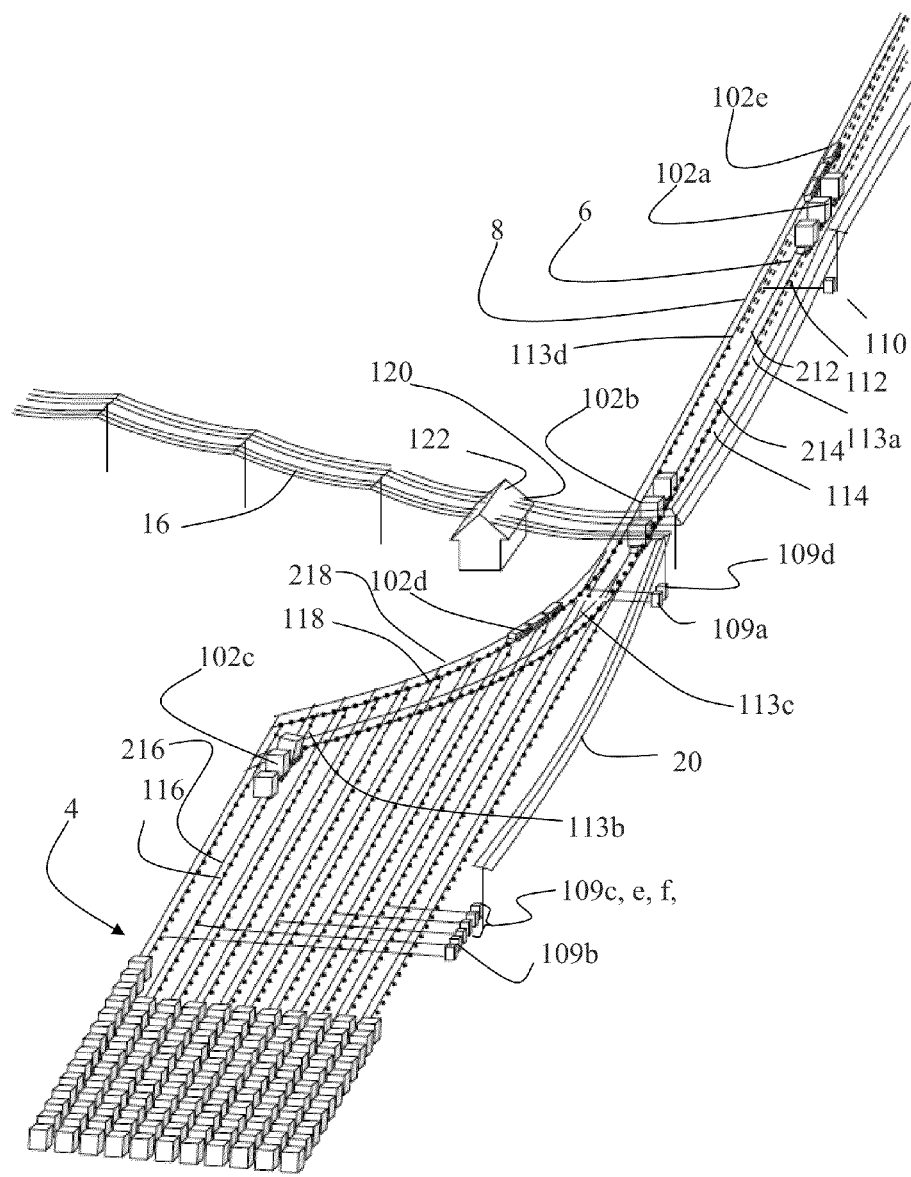
FIG. 2 is a perspective view of an electric railway deployed as an electrical energy storage facility with segments of variable frequency storage tracks, powered by trackside power conversion modules, connecting to sections of fixed frequency primary track.

Referring now to FIG. 2 the operating sequence of an individual shuttle-train on an electrically powered rail energy storage system with variable frequency acceleration/deceleration track segments integrated to direct synchronization primary track sections is detailed.

Figure 5:
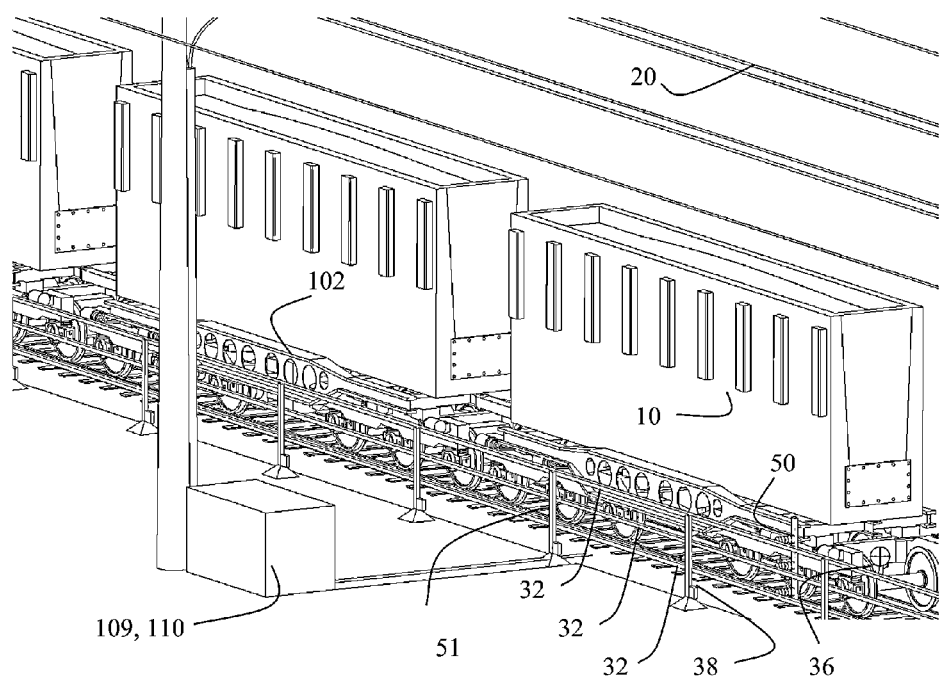
FIG. 5 is detailed view of the 3 rail trackside power supply system.
Figure 6:
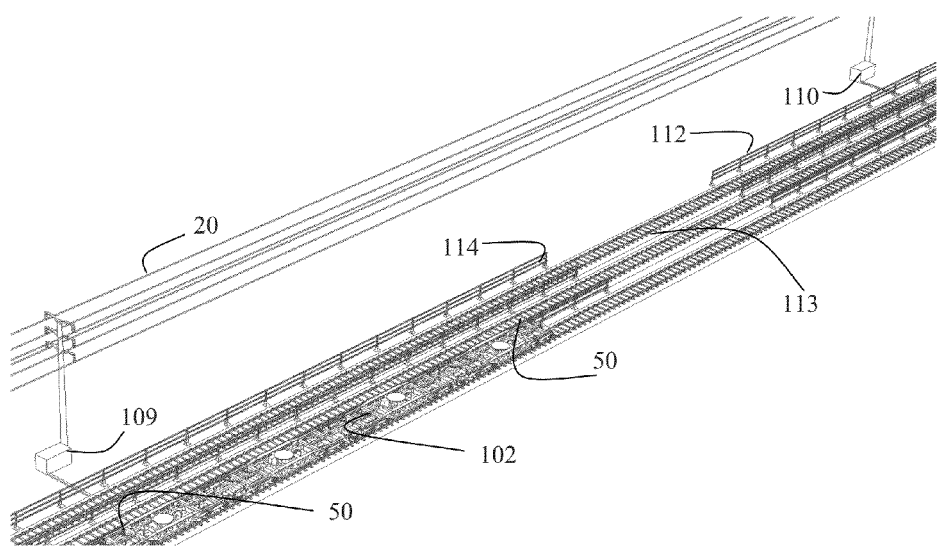
FIG. 6 is detailed view of an isolation section of the 3 rail trackside power supply system.

In FIG. 2 as the loaded shuttle-train 102a descends a steep grade between upper storage yard 2 (as in FIG. 1) and lower storage yard 4 the synchronous generators in traction drive system 30 (described with respect to FIGS. 3 and 4 subsequently) produce electric power by regeneratively braking the 300 ton weight of the loaded train against the force of gravity. The regenerative braking power from the shuttle-trains generators is delivered into the electrical grid via an AC 3 rail power supply system located trackside (as shown in FIGS. 5 and 6) consisting of three individually insulated AC rails 32 affixed to stanchions 51 which parallel the rail tracks. The AC 3 rail power supply on primary connecting track sections 6 and 8 are directly synchronized to the electric grid frequency, at 2,300 VAC via transformers in the trackside synchronous power modules 110 (detailed in FIG. 4) which step up the voltage to that of the 34.5 kVA medium voltage trackside transmission lines 20 which is then transformed to the voltage of the electrical grid via a substation 122. These trackside synchronous power modules 110, which switch and transform current into and out of the AC 3 rail power supply associated with track segments 6 and 8, are placed approximately every 1,000 feet of trackside distance to minimize resistance losses in the AC 3 rail power supply. In FIG. 2 the sections of primary powered track 6 and 8 which are in direct synchronization to the electric grid are associated with AC 3 rail power supplies 112 (shown as double row of dashes for clarity). While descending on track 6 the speed of loaded shuttle-train 102a is maintained constant by synchronous generator 31a (of FIG. 4) locked to the frequency of the electric grid 16. Having the shuttle-train generators in direct synchronization to the utility grid throughout a majority of the travel distance between storage yard 2 and 4 substantially eliminates power conversion losses inherent in otherwise having to convert the alternating current of generators 31*a* into direct current and back into alternating current at grid frequency. In an energy storage system these efficiency losses are significant because as they occur during both charging and discharging cycles their inefficiencies are compounded. The shuttle trains operating in a synchronous mode further provide significant beneficial heavy inertia in the grid. The large mass and frequency stabilization effects of the shuttle trains in operation accommodate frequency perturbations which may occur in the grid due to variable frequency generation systems present elsewhere on the grid. The grid perturbations are absorbed as minor speed variation in the shuttle trains and damped due to the physical inertia of the shuttle train mass.

As the loaded shuttle train 102*a*, approaches the lower storage yard it crosses an isolation segment 113*a* of the 3 rail power supply which insulates the 3 rail powered track section 112 which is in direct synchronization to the grid at 60 Hz from the first segment of variable frequency 3 rail power supply segment 114, associated with acceleration/deceleration track segment 214. In FIG. 2 the segments of track 214, 216 and 218 are associated with 3 rail power supply segments 114, 116 and 118 respectively (designated by a single row of dots) which are powered by the variable frequency trackside power conversion modules 109 of FIG. 3.

Figure 3:
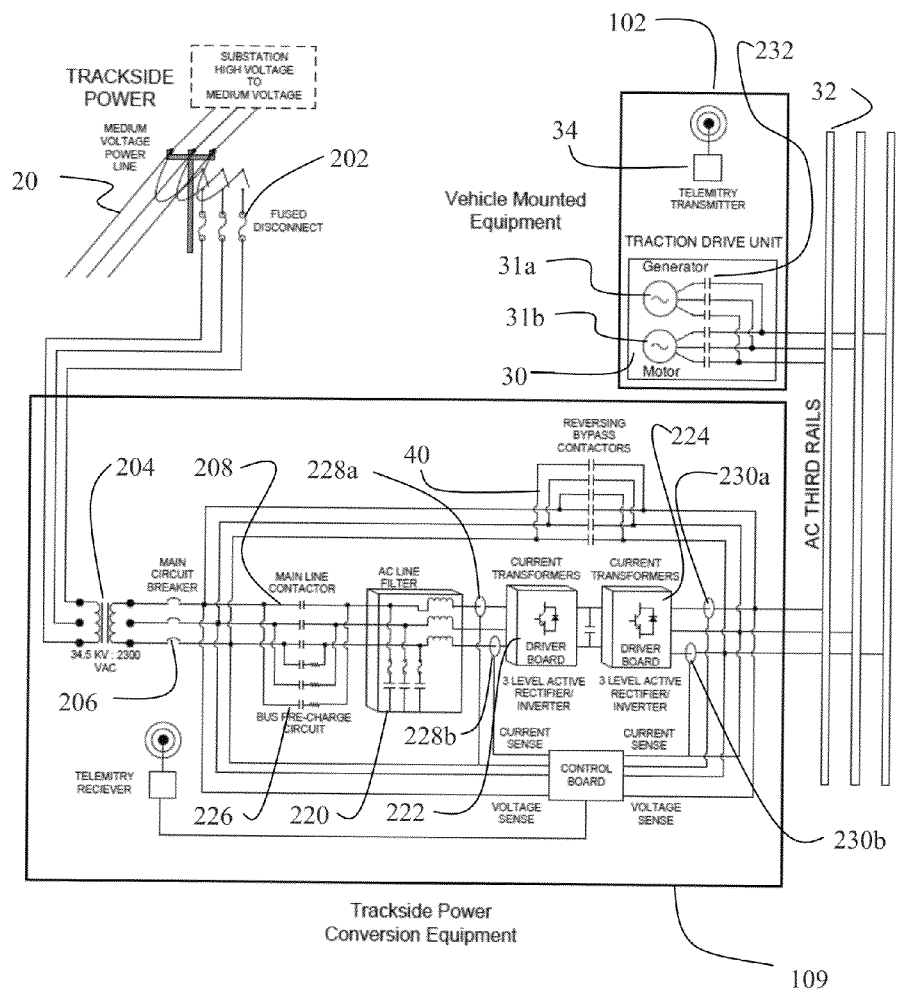
FIG. 3 is a schematic view of a variable frequency trackside power conversion module for powering variable frequency track segments.

Prior to train 102*a* crossing the isolation section 113*a* the frequency of 3 rail power supply segment 114 is placed in 60 Hz synchronization with the electric grid by facility control system 120 (located in the embodiment shown within the substation 122) through telemetry commands to the variable frequency trackside power conversion module 109*a* powering 3 rail power supply segment 114. A schematic of the variable frequency trackside power conversion modules 109*a*-*g* is shown in FIG. 3. With the frequency of the two 3 rail power supply segments 112 and 114 synchronized train 102 transitions onto track segment 214 and is indicated in its new position as 102*b*. After receiving train 102*b* at grid frequency the trackside power conversion module 109*a* stows the train by modulating the power frequency supplied to 3 rail power supply segment 114 based on telemetry data on the speed and location of the train received by the facility control system 120 from the telemetry transmitter 34 of the shuttle-train. In such manner train 102*b* is appropriately decelerated as it enters storage yard 4. Continuing further into the storage yard shuttle-train 102*b* crosses isolation gap 113*b* between variable frequency 3 rail power supply segments 114 and 116, Before crossing isolation gap 113*b* the power frequency of 3 rail power supply segment 116 controlled by variable frequency trackside power conversion module 109*c* was synchronized with that of 3 rail power supply segment 114. Control commands from the facility control system 120 which receive speed and position data by telemetry from shuttle-train telemetry transmitter 34 command the 3 rail power supply segment 116 variable frequency trackside power conversion module 109*c* to continue to slow and position the shuttle-train, now seen as 102*c*, into position to unload the carried masses at designated positions.

After unloading the masses in storage yard 4 the empty shuttle-train, now seen as 102*d* is commanded through a control process in which the main line contactors 208 of FIG. 3 are reversed, in variable frequency trackside power conversion module 109*b* to track 116 reversing the travel direction of shuttle train 102*d*. As the frequency of power supplied to 3 rail power supply segment 116 associated with the storage track segment 216 is increased by variable frequency trackside power conversion module 109*b*, the shuttle train is accelerated through isolation gap 113*b* onto track segment 218 and associated 3 rail supply segment 118 which receives 102*d* at a matching trackside power frequency provided by variable frequency trackside power conversion module 109*d*. Prior to train 102*d* crossing back across isolation section 113*b* the variable frequency trackside power conversion module 109*d* for 3 rail power supply segment 118 has accelerated train 102*d* up to the speed at which synchronous motor 31*b* (of FIGS. 3 and 4) is operating at grid frequency. With the output frequency of variable frequency trackside power conversion module 109*d* matched to grid frequency, shuttle train 102*d* now crosses isolation gap 113*d* and is seen FIG. 2 as 102*e* returning to the upper storage yard 2 along primary connecting track 8 at a constant speed in direct synchronization to the electric grid 16. Isolation sections and variable frequency 3 rail power supply segments with associated track segments comparable to those described with respect to the lower storage yard are present in the upper storage yard.

The elements associated with the shuttle train and trackside power supply for variable frequency operations are shown in FIG. 3. Substation 122 attached to high voltage power lines from the grid 16 transforms available power to 34.5 KV. Trackside electrical distribution lines 20 distribute or return power along the trackside of the system. Fused disconnects 202 connect the electrical distribution lines to the variable frequency trackside power conversion modules 109 (for example module 109*a* as shown in FIG. 2) through transformers 204 for voltage adjustment between 34.5 KV and 2300 VAC operational voltage. Circuit breakers 206 interconnect through a main line contactor 208 to an AC line filter 220 to a first utility side 3-level active rectifier/inverter 222. Main line contactors 208 may be reversible (not shown) for direction change on the shuttle-trains. Alternatively, the inverters may provide reversing for altering direction of the shuttle-trains. For the embodiments shown, an insulated gate bipolar transistor (IGBT) circuit is employed. A second generator side 3-level active rectifier/inverter 224 transfers power to (or from) the motors 31*b* or generators 31*a* on shuttle train 102 through the 3 rail power supply rails (for example 3 rail power supply segment 114). In certain embodiments, the motor and generator are combined as a single motor/generator unit. A bus pre-charge circuit 226 also commanded by the control board is provided. Current sensors 228*a* and 228*b* and voltage sensors are employed by the control board for sensing and control of the trackside power system side of the rectifier inverters and current sensors 230*a* and 230*b* and voltage sensors are employed by the control board for sensing and control of the motor/generator power. The control board provides acceleration, deceleration and trimming control of the motor/generators. Motor contactors 232 on each shuttle train allow disconnection of the motor and generator from the AC 3 rail power supply rails to depower the shuttle train allowing presence of more than one shuttle train between isolation segments on a track segment associated with a variable frequency.

Reversing bypass contactors 40 are provided for direct connection of the trackside power system for synchronous operation at the predetermined control speed for the shuttle unit. Acceleration of the shuttle unit to the control speed is accomplished through the IGBT rectifier/inverter circuits at which time the control board engages the appropriate reversing bypass contactors for synchronous operation. When required, the control board reengages the IBGT rectifier/inverter circuits, disconnecting the reversing bypass contactors, for deceleration of the shuttle train.

Figure 4:
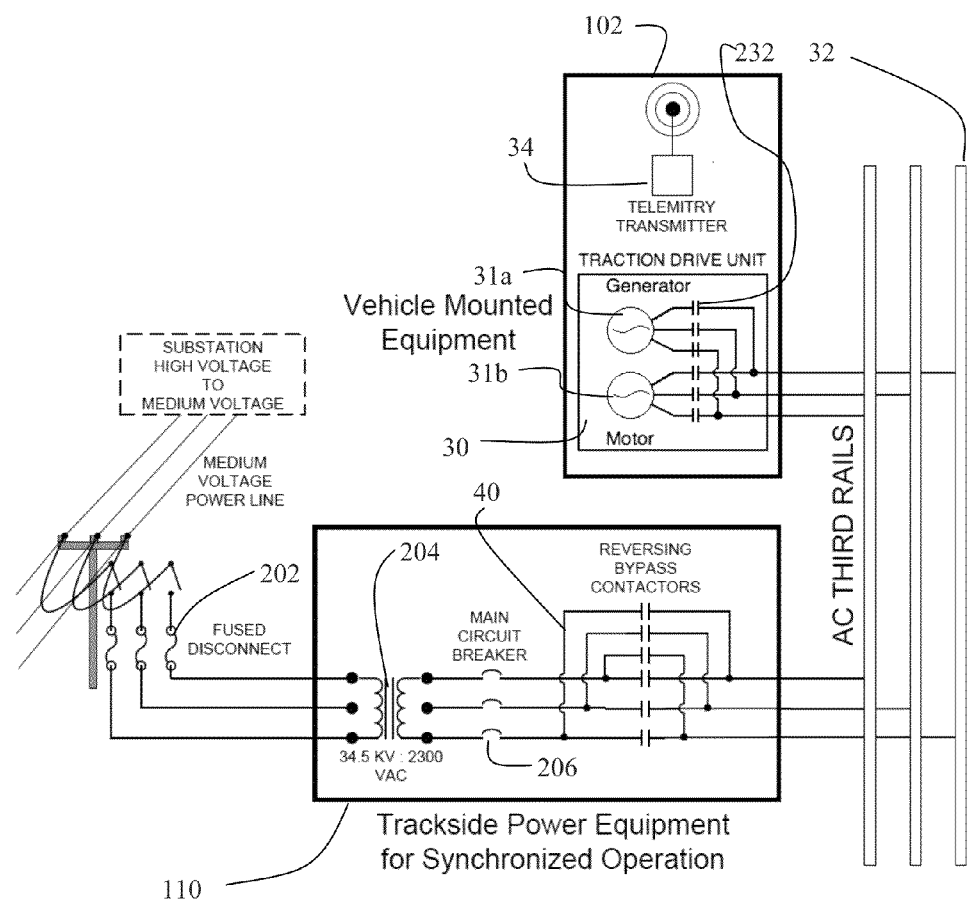
FIG. 4 is a schematic view of a direct synchronization trackside power supply module for powering direct synchronization of the primary interconnecting track segments.

The elements associated with the shuttle train and trackside power for synchronous operation are shown in FIG. 4. Similar to FIG. 3, substation 122 attached to high voltage power lines from the grid 16 transforms available power to 34.5 KV. Trackside electrical distribution tines 20 distribute or return power along the trackside of the system. Fused disconnects 202 connect the electrical distribution lines to transformers 204 for voltage adjustment between 34.5 KV and 2300 VAC operational voltage. Circuit breakers 206 connect through reversing bypass contactors 40 to 3 rail power supply rails (for example 3 rail power supply segment 112) associated with each primary track 6, 8 for interconnection to the contactors 232 on the shuttle-trains 102. Reversing bypass contactors 40 are provided for direct connection of the trackside power system for synchronous operation at the predetermined control speed for the shuttle unit.

Control elements of the shuttle-trains operating on the automated railway of the described embodiment are seen in greater detail in FIG. 5 wherein a position sensor 36 on loaded train 102 receives position information by interrogating a passing passive trackside position markers 38 affixed to each of the 3 rail power supply stanchions 31. This position information is relayed via the onboard train telemetry transmitter 34 to the facility control system 120 which is thereby able to track the position and speed of the shuttle train in order to issue the appropriate commands to the variable frequency trackside power conversion modules 109 to control speed of the shuttle train.

In an example embodiment there are multiple shuttle-trains operating on the rail network simultaneously. The number of operating shuttle-trains governs the spacing of the shuttle-trains in progression along primary tracks 6 and 8. Therefore, since it is desirable to individually control the motion of a single train with a single variable frequency trackside power conversion module 109, the lengths of the variable frequency acceleration/deceleration track segments between isolation gaps needs to be shorter than the spacing between shuttle-trains operating on the primary tracks. The discrete handling of multiple trains is further accomplished by having a number of individually powered storage yard tracks. With this structure there is never more than one train being controlled by one or more variable frequency trackside power conversion modules. However there may be situations in which it is desirous to have more than one variable frequency trackside power conversion module assist in powering an individual train in which case the wiring of more than one module 109 to an individual track would be provided for. It is also desirable to have the ability to disconnect individual shuttle-trains along powered segments of track. For example it may be desired to park shuttle-trains on active storage yard tracks beneath rows of supported masses.

Referring now to FIG. 6, a detailed description of an isolation gap 113 between 3 rail power supply segment 112 supplied by a synchronous power module 110, of FIGS. 4, and 3 rail power supply segment 114 powered by a variable frequency trackside power conversion module 109 of FIG. 3, may be seen. It is key to note that while the distance of the gap between segments 112 and 114 have been exaggerated for clarity a key enabling element is the placement of two or more of the 3 rail electrical contactors 50 on the shuttle-train 102 at a distance apart which exceeds the distance of the gap between 112 and 114. As such when train 102 crosses isolation gap 113 and the frequency of synchronous power module 110 and variable frequency trackside power conversion module 109 have been aligned by a signal from the control system there is no interruption in current to the traction drive system of the shuttle train. The facility control system is programmed to maintain the frequency of opposing 3 rail power supply segments in synchronization with one another so long as a vehicle is transitioning over the isolation section.

In the case of an electrified railway for the described embodiment deployed for use as an energy storage system, the facility operates in a predetermined manner dependant on such factors as storing or releasing energy, the rate of power being stored or released, weather conditions, and others. It uses sensors that include but are not limited to individual wheeled vehicle position, velocity, acceleration, mass position, electric component amperage draw, electric component voltage, electric component temperature, mechanical component temperature, rail switch position and others. These sensors can be hard wired, wireless or other. The control system may use controllers that include but are not limited to individual wheeled vehicle friction brakes, track switch motion, electric and electronic switches, wheeled vehicle mass lifting mechanisms and others. These controllers can be electro-mechanical, pneumatic, hydraulic or other.

The process of starting, operating and stopping the electric powered railroad of the present invention can be a pre planned set of steps that the components go through. There can also be pre planned steps for changing the power input or output, removing a wheeled vehicle from the process for repair and others. Each step in the process can be accomplished by the use of a single or multiple sensors and or actuators. A computer or computers will be used to control the rail system in operation. Following is a description of computer sensors, actuators and an algorithm that can be used to control said electrified system. Commencing with a loaded shuttle train in transit downward from the upper storage yard to the tower storage yard, the shuttle train generator 31b is interconnected to the AC 3 rail track side power segment 112 with synchronous power from regenerative braking of the shuttle train by the generator converted through a synchronous power module 110 to the power grid through substation 122. When transmissions to the facility control system 120 from sensor 36 on the shuttle train detecting location tags 38 trackside indicating that the shuttle train is approaching the isolation segment 113a, the facility control system directs variable frequency trackside power conversion module 109a to establish the synchronous frequency. The shuttle train passes across isolation segment 113a and then commences power transfer with variable frequency trackside power conversion module 109a. At appropriate location based on signals from sensor 36 on the shuttle train, the control system directs variable frequency trackside power conversion module 109a to reduce frequency thereby decelerating the shuttle train for arrival in the tower storage yard. When transmissions to the facility control system 120 from sensor 36 on the shuttle train detecting location tags 38 trackside indicating that the shuttle train is approaching the isolation gap 113b, the facility control system directs variable frequency trackside power conversion module 109b to establish a common frequency with variable frequency trackside power conversion module 109a. Once the shuttle train has passed over isolation segment 113b the facility control system directs frequency control of variable frequency trackside power conversion module 109b to decelerate or accelerate the shuttle train as necessary to transition through the storage yard and position the carried mass for off loading. When the mass is offloaded, the facility control system directs frequency control of variable frequency trackside power conversion module 109b to reverse the direction of shuttle train and accelerate back along track segment 116 for switching onto track segment 118. When transmissions to the facility control system 120 from sensor 36 on the shuttle train detecting location tags 38 trackside indicate that the shuttle train is re-approaching the isolation gap 113b and c, the facility control system directs variable frequency trackside power conversion module 109d to establish a common frequency with variable frequency trackside power conversion module 109b. Once the shuttle train has passed over isolation segment 113 b and c the facility control system directs frequency control of variable frequency trackside power conversion module 109d to accelerate the shuttle train to synchronous frequency for transition to the uphill primary track 8, assuring that synchronous frequency is reached prior to reaching isolation segment 113d. Once the shuttle train has passed across isolation segment 113d, synchronous operation under power received from synchronous power modules 110 (each 1,000') is maintained to the upper storage yard. This is only one example of computer sensors, actuators and algorithm which may be utilized, in this case for use of such facility as an energy storage system; however operation is not limited to these computer sensors, actuators and algorithm.

In broad embodiment, the present invention is a more efficient and lower cost means of powering an electrified rail system on which a multitude of electrically powered vehicles are in simultaneous synchronized operation. When the present invention is utilized for added benefit in an energy storage system the rate of input and output of such system can be varied considerably by controlling the dispatch speed and or quantity of the shuttle-trains placed into motion. Standard friction brakes can be used to park the electric powered vehicles on such systems in the event of an electrical failure.

While the foregoing written description of the invention enables one of ordinary skill to make and use an example embodiment, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A power supply and control system for electrically powered shuttle-trains comprising:
   at least one shuttle train having a motor and a generator and a location sensor;
   a first plurality of track segments with associated synchronous power modules mounted trackside adjacent thereto exchanging power synchronously with a power grid through a plurality of power supply rail segments connectable to the motor or generator responsive to the location sensor;
   a second plurality of track segments in proximity to upper and lower storage yards with associated variable frequency power modules mounted trackside adjacent thereto exchanging power through a second plurality of power supply rail segments connectable to the motor or generator;
   isolation segments insulating adjoining segments of the first plurality of synchronous track segments and second plurality of variable frequency segments; and,
   a control system interconnected to the variable frequency power modules for controlling frequency responsive to the location sensor.

2. The power supply and control system of claim 1 wherein:
   said control system matches frequency of selected variable frequency power modules to adjacent synchronous or variable frequency power modules responsive to the location sensor.

3. The power supply and control system of claim 2 wherein said control system is further responsive to the location sensor for selective variation of frequency of the variable frequency power modules for acceleration or deceleration of the shuttle train through the motor or generator.

4. The power supply and control system of claim 1 wherein the synchronous power modules are located approximately every 1000 feet along the first plurality of track segments.

5. The power supply and control system of claim 1 wherein the first plurality of track segments comprises a majority of total track length between storage yards.

6. The power supply and control system of claim 2 wherein the location sensor receives position information by interrogating passing passive trackside position markers.

7. The power supply and control system of claim 6 wherein position information is relayed via an onboard train telemetry transmitter to the control system, said control system tracking position and speed of the shuttle train and issuing speed commands to the variable frequency trackside power conversion modules.

8. The power supply and control system of claim 1 wherein the control system aligns frequency of a synchronous power module and an adjacent variable frequency trackside power conversion module separated by an isolation segment for shuttle trains crossing the isolation segment.

9. The power supply and control system of claim 1 wherein variable frequency trackside power conversion modules are spaced for control of separate shuttle units on each track segment.

10. The power supply and control system of claim 1 wherein the power supply rail segments comprise an AC 3 rail power supply system located trackside, 11. The power supply and control system of claim 1 wherein the motor and generator are combined in a single motor/generator unit.

12. A method of operation of an electric railway system having a first plurality of track segments with associated synchronous power modules exchanging power synchronously with a power grid through a plurality of power supply rail segments connectable to a motor or generator of a shuttle train; a second plurality of track segments with associated variable frequency power modules exchanging power through a second plurality of power supply rail segments connectable to the motor or generator; isolation segments separating adjoining power supply rail segments; and, a control system interconnected to the variable frequency power modules for controlling frequency comprising the steps of:
   interconnecting the shuttle train generator to a first power supply, rail segment on a primary downhill track with synchronous power from regenerative braking of the shuttle train by the generator;
   converting power through a direct synchronization power module to a power grid;
   sensing a location by a sensor on the shuttle train indicating that the shuttle train is approaching an isolation segments;
   directing an adjoining first variable frequency power module to establish the synchronous frequency;
   when the shuttle train passes across the isolation segment commencing power transfer with the first variable frequency power module through a second power supply rail segment;
   directing the first variable frequency power module to reduce frequency thereby decelerating the shuttle train.

13. The method as defined in claim 12 further comprising:
   sensing a location sensor indicating that the shuttle train is approaching a second isolation gap;

directing a second variable frequency power module to establish a COM frequency with the first variable frequency power module;

when the shuttle train passes over the second isolation segment directing frequency control of the second variable frequency power module to exchange power through a third power supply rail segment to decelerate or accelerate the shuttle train as desired.

14. A method as defined in claim 13 further comprising:

directing frequency control of the second variable frequency power module to reverse the direction of shuttle train and accelerate back along a track segment associated with the third power supply rail segment for the switching onto a return track segment;

sensing the location sensor on the shuttle train indicating that the shuttle train is approaching a third isolation gap;

directing a fourth variable frequency power module to establish a common frequency with the third variable frequency power module.

15. The method as defined in claim 14 further comprising:

when the shuttle train has passed over the third isolation segment directing frequency control of the fourth variable frequency power module to accelerate the shuttle train to synchronous frequency for transition to an uphill primary track segment;

sensing the location sensor to assure that synchronous frequency is reached prior to reaching a fourth isolation segment;

when the shuttle train has passed across the fourth isolation segment operating under synchronous power received from the synchronous power module,

16. The method as defined in claim 12 in which the step of converting power further comprises absorbing frequency perturbations which may occur in the grid due to variable frequency generation systems present elsewhere on the grid as minor speed variation in the shuttle trains and damping such perturbations due to the physical inertia of the shuttle train mass

* * * * *